United States Patent [19]

Myong et al.

[11] Patent Number: 4,807,799

[45] Date of Patent: Feb. 28, 1989

[54] DEVICE FOR APPLYING SOLDER

[75] Inventors: Inho Myong, Newark; Richard Freimanis, Fremont, both of Calif.

[73] Assignee: Raychem Corporation, Menlo Park, Calif.

[21] Appl. No.: 200,998

[22] Filed: Jun. 1, 1988

[51] Int. Cl.$^4$ .............................................. B23K 31/02
[52] U.S. Cl. .................... 228/212; 228/56.3; 228/57; 228/242; 228/256
[58] Field of Search ............... 228/56.3, 57, 212, 242, 228/256, 33

[56] References Cited
FOREIGN PATENT DOCUMENTS

| | | | |
|---|---|---|---|
| 2018810 | 11/1971 | Fed. Rep. of Germany | 228/56.3 |
| 0061985 | 4/1983 | Japan | 228/242 |
| 0625890 | 9/1978 | U.S.S.R. | 228/212 |
| 0698741 | 11/1979 | U.S.S.R. | 228/212 |
| 1021544 | 6/1983 | U.S.S.R. | 228/57 |

*Primary Examiner*—Nicholas P. Godici
*Assistant Examiner*—Karen Skillan
*Attorney, Agent, or Firm*—Herbert G. Burkard; Simon J. Belcher

[57] ABSTRACT

A device for applying solder to two opposite faces of an object, such as an array of conductors of a flat electrical cable, in a predetermined location, comprises a support sheet having a line of weakness along which the sheet can be folded to define two arms, each having a free end; a quantity of solder located on a face of each of the arms of the support sheet; and means for controlling flow of the solder, when heated, in a direction perpendicular to the line of weakness. The controlling means may be a strip of a resiliently deformable material.

17 Claims, 2 Drawing Sheets

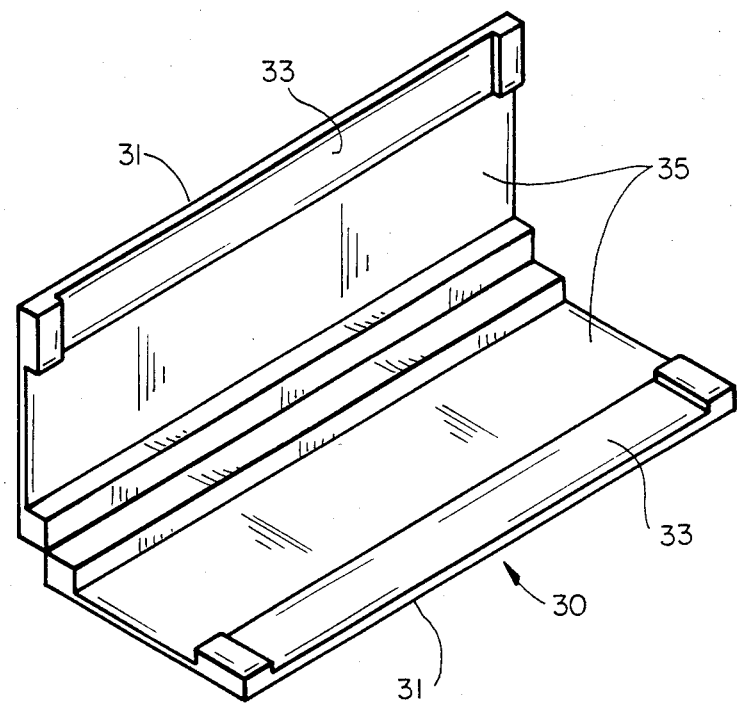
FIG_2
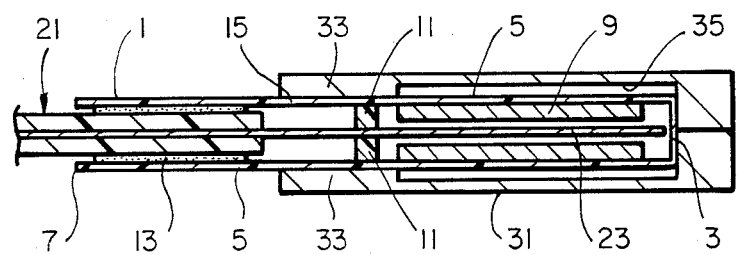
FIG_3

DEVICE FOR APPLYING SOLDER

BACKGROUND OF THE INVENTION

The present invention relates to a device for applying solder to one or more faces of an object, particularly to two opposite faces of an object, in a predetermined location.

When it is desired to make a solder connection to an object, it is common first to apply a coating of solder to the object. This process is often referred to as pretinning. When the connection is to be made to the end of the object, the object may be pretinned by dipping in molten solder. While this method of pretinning has the advantage of being quick and easily controlled, it suffers from the disadvantage that it requires that there be sufficient space around the object for a container for the molten solder. Such space is not always available. For example, the object may comprise an electrical conductor which might be fixed at one end and not be sufficiently flexible to be inserted into a container of molten solder. In another example, the conductor may be a component of a piece of electrical or electronic apparatus. During assembly or more especially during repair, it may be desirable to pretin the conductor without removing it from the apparatus. Lack of space around or within the apparatus my preclude the introduction of a container of molten solder, and furthermore, it may be undesirable to introduce large quantities of molten solder into such an environment because of the possibility of loose solder forming short circuits. Yet further, particularly during repair in situ, it might not be possible to maintain a large quantity of solder in a molten state because of the lack of a suitable heat or power source.

SUMMARY OF THE INVENTION

The present invention provides a device for applying solder to a face of an object in a predetermined location relative to an edge of the object, without the need for sufficient space around the object for a container for molten solder.

Accordingly, in a first aspect, the invention provides a device for applying solder to a face of an object towards an edge thereof, comprising:

(a) a support sheet having a line of weakness along which the sheet can be folded to define two arms, each having a free end;

(b) a quantity of solder located on a face of one of the arms of the support sheet; and (c) means for controlling flow of the solder, when heated, in a direction perpendicular to the said line of weakness.

DESCRIPTION OF THE INVENTION

The device of the invention allows solder to be applied to an object in a predetermined location relative to an edge of the object by engagement of the line of weakness with the said edge. The device is particularly applicable to thin objects in which case the line of weakness allows the support sheet to be folded to adopt a U-shape, especially when the arms of the sheet extend substantially parallel away from the line of weakness. In this case, the device will be positioned with one arm of the support sheet on each side of the object.

The device of the invention is suitable for applying solder to a flat object. It is particularly well suited to applying solder to an array of electrical conductors, especially to the stripped conductors of a multi-conductor electrical cable. Preferably, the conductors of the cable are flat conductors, by which is meant that they have a square or especially rectangular cross-section.

Preferably, the device is provided with a quantity of solder on a face of each of the arms of the support sheet. By folding the support sheet into a U-shape, such a device may be used to apply solder to each of two opposite surfaces of an object. When the object comprises an array of conductors, surface tension effects may be relied on to provide solder on more than just the faces of the conductors that are contacted by the device. When the conductors are flat conductors that are relatively thin, for example less than 0.5 mm thick, it is possible to obtain a solder coating around the entire periphery of each conductor.

Preferably the arrangement of the solder on the two arms of the support sheet is symmetrical so that the arrangement on one of the arms is a mirror-image of that on the other arm.

The solder may be provided in the form of a continuous tape. Preferably the tape extends substantially parallel to the line of weakness so that the device can conveniently provide a strip of solder parallel to an edge of the object. For some applications, it can be advantageous to have the solder strip arranged at an angle to the edge of the object, in which case the solder tape will extend at an angle of between 0° and 90° to the line of weakness.

When it is desired to provide solder on a face of an object at points which differ in distance from the edge thereof, the solder may be provided on the surface of the support sheet in an appropriate pattern of discrete quantities.

The solder may be provided on the support sheet by lamination, this being especially preferred when the solder is provided as a continuous strip. The solder may however be provided by other techniques such as by printing. This being especially preferred when the solder is provided in a pattern of discrete quantities.

The solder provided on the support sheet preferably includes an appropriate flux. This has the advantage that the quantity and type of flux for use in a particular application can be controlled, thereby removing the possibility of error during installation. This is not possible when tinning is achieved by dipping in a pot of molten solder when it is necessary to apply a flux as a separate operation.

The device of the invention preferably includes a quantity of adhesive located in the same face of the support sheet as the quantity of solder between the quantity of solder and the free end of the arm on which the solder is provided. The adhesive serves to hold the device in place when it is heated to cause the solder to flow. The adhesive may also serve as the means for controlling the flow of solder in a direction perpendicular to the line of weakness in the support sheet.

A quantity of adhesive may be provided on each of the arms of the support sheet. This enables the device to be located on the object securely. It is particularly preferred when the device is to be folded so that one arm extends along each of the opposite faces of an object, for example to provide solder on both top and bottom surfaces of an array of stripped conductors.

The adhesive will preferably be a pressure-sensitive adhesive which allows the device of the invention to be attached temporarily to an object while solder is applied to the object, but which then allows the device to be removed. The use of such an adhesive also facilitates handling of the device prior to use since the device can be mounted on an appropriate support having a release surface, such as a sheet of release paper.

While the adhesive, when present, may serve to control flow of solder, it is preferred to use a strip of resiliently deformable material mounted on the same face of the support sheet as the quantity of solder. The use of a resiliently deformable material ensures that the strip conforms to the surface of the object when pressure is applied in order to provide an effective seal. The dimensions of the strip will preferably be selected so that the depth of the solder applied to the object can be controlled, thereby allowing the amount of solder applied to be controlled which is important for reliable connection.

The strip preferably extends substantially parallel to the line of weakness in the support sheet, for a preferred configuration of applied solder.

A strip for controlling solder flow may be provided on the support sheet on one or both sides of the or each quantity of solder depending on the direction of the solder flow that is to be controlled. It is preferred that a strip is provided at least between the or each quantity of solder and tthe free end of the arm of the support sheet on which the solder is located. This allows flow of solder in a direction away from the line of weakness in the support sheet to be controlled. In the case of an electrical conductor to which solder is to be applied, solder is prevented from flowing along the conductor away from its free end towards insulation material which encloses the conductor.

A strip of resilient material may also be provided between the or each quantity of solder and the line of weakness on the support sheet, in use to control flow of solder on the surface of the object towards the free end thereof. Such control may also be provided by the folded support sheet itself, since by appropriate positioning and clamping, solder can be arranged to flow along the object, towards the free end thereof, where it will encounter the fold in the support sheet. The strip of resilient material preferably comprises an elastomer such as a rubber, especially a silicone rubber.

When the device includes a strip of resilient material in addition to a quantity of adhesive, it is preferred that there be a portion of the support sheet between the resilient material and the adhesive. This allows pressure to be applied to the resilient material to make a seal to the object while ensuring that no pressure is applied to the adhesive coated portion of the support sheet, which could lead to adhesive being left on the object when the device is removed therefrom. In some circumstances, it is important for no adhesive to be left on the object; for example when solder additional to that provided by the device is to be applied to an object it is important that the initial quantity of solder that is provided by the device is not contaminated by other materials such as an adhesive.

For use with thin objects, the line of weakness in the support sheet is preferably such that when the sheet is folded into a U-shape, the arms extend substantially parallel from the line of weakness. Such a configuration may require appropriate clamping. The line of weakness may be provided, for example, by a U-shaped groove in the support sheet which can be considered as two sub-lines of weakness, at or towards the base of the U. A U-shaped support sheet with parallel arms has the advantage that, cooperating with a strip of resiliently deformable material when present, the support sheet is able to provide a mold in which the solder can flow on the surface of the object, and thus to control the thickness of the solder that is applied to the object.

The support sheet may comprise a single sheet in which a line of weakness is cut or otherwise provided. To simplify manufacturing, it is preferred to use two sheets of material, each having a straight edge which is held adjacent, and substantially parallel, to the straight edge of the other sheet by a relatively flexible bridging sheet. The bridging sheet may be of the same material as the stiff sheets, and simply have a smaller thickness. The sheets may be attached to one another by means of an adhesive. In this connection, the straight edges of the sheets of stiff material, together with the sheet of flexible material, define a U-shaped groove in the support sheet.

The support sheet may comprise several sheets that are laminated together, some of which bear solder and some of which bear a quantity of adhesive.

The line of weakness may be provided in another manner, for example by a line of perforations or indentations.

The material selected for the support sheet will depend on the solder material that is to be used since it is necessary that the support sheet is not affected adversely when the device is heated to cause the solder to fuse. For example, when the solder comprises 65% by weight tin and 35% by weight lead, it is preferred to use a polyimide for the support sheet.

Preferably the distance from the line of weakness to the means for controlling the flow of solder, especially when it is provided by a strip of resiliently deformable material, is at least about 3 mm, more preferably at least about 6 mm; preferably the distance is less than about 15 mm, more preferably less than about 10 mm.

Preferably the strip of resiliently deformable material when present stands at least about 0.2 mm proud of the support sheet, more preferably from about 0.4 mm to 0.6 mm.

When the solder is in the form of a tape, the width of the tape is preferably at least about 2.5 mm, more preferably at least about 4 mm; preferably the width is less than about 10 mm, more preferably less than about 7 mm. The height of the strip is preferably from about 10 to about 50 micrometers, more preferably from about 30 to about 40 micrometers.

BRIEF DESCRIPTION OF THE DRAWINGS

FIG. 2 is an isometric view of a tool for installing the device shown in FIG. 1; and FIG. 3 is a cross-section through the device shown in FIG. 1 and the tool shown in FIG. 2 positioned for installation on an end of a multiconductor cable.

DESCRIPTION OF PREFERRED EMBODIMENTS

Figure 1:
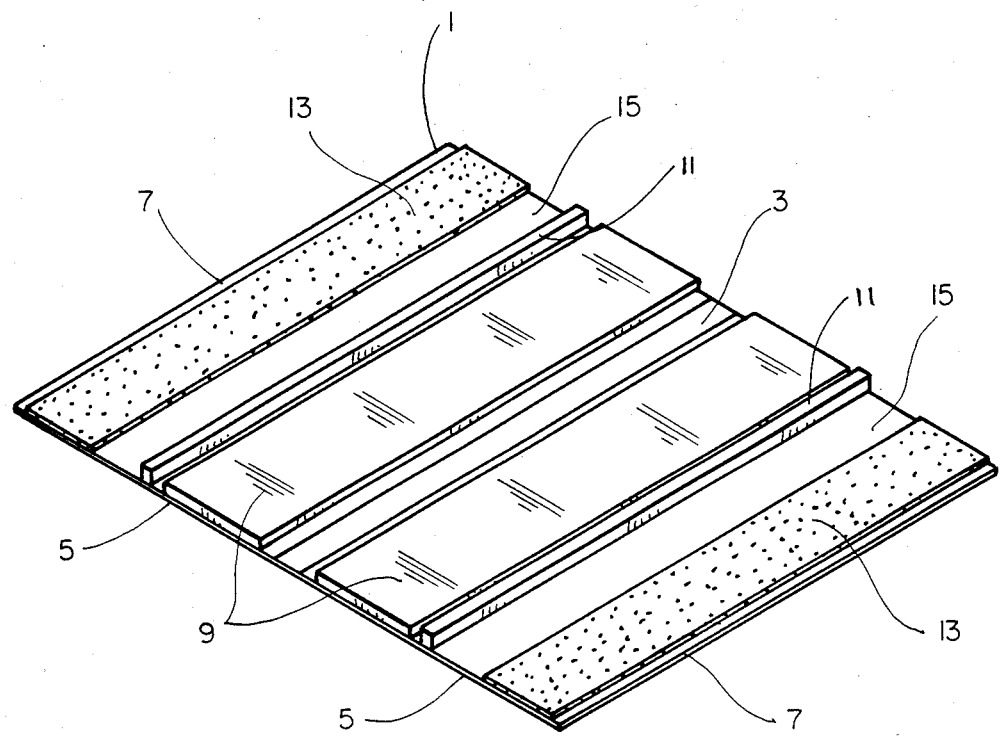
FIG. 1 is an isometric view of a device according to the invention prior to installation.

FIG. 1 shows a device for applying solder to two opposite faces of a thin object such as to the stripped end portions of the conductors of a multiconductor flat cable, especially when the conductors themselves are rectangular in cross-section. The device comprises a support sheet 1 of a polyimide material which has a line of weakness 3 along which the sheet can be folded to define two arms 5 each having a free end 7. The line of weakness is U-shaped in cross-section.

A quantity of solder in the form of a continuous strip is provided on a face of each of the arms 5. A strip 11 of a resiliently deformable material is also provided on each of the faces of the arms 5 between the strip of solder and the respective free end. The strip 11 provides a seal between the support sheet 1 and a surface of the object on which the solder is to be provided to control flow of the solder in a direction perpendicular to the line of weakness 3.

At the free end 7 of each of the arms 5, a coating 13 of a pressure sensitive adhesive is provided, for forming a bond between the support sheet and an object to which solder is to be applied, for locating the device on the object.

An uncoated portion 15 of the support sheet is provided between the strip 11 of resiliently deformable material and the portion of the sheet that is coated with adhesive.

FIG. 2 shows a tool 30 for applying pressure to the device shown in FIG. 1. The tool comprises two hinged arms 31, each having a portion 33 for applying pressure, and a cavity 35. The tool is positioned so that pressure is applied by the pressure applying portions 33 to the portions of the support sheet 1 that bear the strips 11 of resiliently deformable material and that no pressure is applied to the portion of the support sheet that bear solder. This ensures that flow of solder when heated is not affected by the application of pressure to the device.

The tool may be incorporated into a heater, or may itself be arranged to provide heat to cause the solder to fuse. Otherwise, the tool together with the device and the object may be heated by an external source of heat.

FIG. 3 shows the device shown in FIG. 1 positioned relative to a flat cable 21. The insulation has been removed from an end portion of the cable to expose the conductors 23 to which solder is to be applied. To install the device, the support sheet 1 is folded along its line of weakness. The U-shape of the line of weakness 3 ensures that when the sheet is folded, the arms 5 extend from the line of weakness 3 substantially parallel to one another. The cable 21 is positioned within the folded support sheet 1 so that the ends of the conductors 23 abut the support sheet 1 at the line of weakness 3. The dimensions of the stripped portion of the cable and of the device are such that the strips 11 of resiliently deformable material contact the exposed conductors 23, and that the stripped portion of the cable extends part way along the uncoated portion 15 of the support sheet 1.

The tool 30 is positioned around the device and the object so that the pressure applying portions 33 of the tool are positioned against the portions of the support sheet 1 that bear the strips 11 of resiliently deformable material, and so that the portions of the support sheet that bear the solder are within the cavity 35 in the tool.

Pressure is applied to the device by means of the pressure applying portions 33 of the tool so that a seal is formed between the support sheet 1 and the conductors 23 by means of the strips 11 of resiliently deformable material. The seals control the flow of solder away from the ends of the conductors and, together with the folded support sheet itself, define a mold in which the solder can flow when heated.

The assembly of the device, the cable and the tool is then heated to cause the solder 9 to fuse and to flow on the surface of the conductors 23.

What is claimed is:

1. A device for applying solder to a face of an object towards an edge thereof, comprising:
    (a) a support sheet having a line of weakness along which the sheet can be folded to define two arms, each having a free end;
    (b) a quantity of solder located on a face of one of the arms of the support sheet; and
    (c) means for controlling flow of the solder, when heated, in a direction perpendicular to the said line of weakness.

2. A device as claimed in claim 1, in which a quantity of solder is provided on a face of each of the arms of the support sheet.

3. A device as claimed in claim 2, in which the arrangement of the solder on the two arms of the support sheet is symmetrical so that the arrangement on one of the arms is a mirror-image of that on the other arm.

4. A device as claimed in claim 1, which includes a quantity of adhesive located on the same face of the support sheet as the quantity of solder, between the quantity of solder and the free end of the respective arm.

5. A device as claimed in claim 4, in which the quantity of adhesive is provided in the form of a coating on a strip-like portion of the face of the support sheet at the free end of the arm.

6. A device as claimed in claim 4, which includes a quantity of adhesive on each of the arms of the support sheet.

7. A device as claimed in claim 1, in which the means for controlling flow of the solder comprises a strip of resiliently deformable materials mounted on the same face of the support sheet as the quantity of solder.

8. A device as claimed in claim 7, in which the strip of resiliently deformable material extends substantially parallel to the line of weakness in the support sheet.

9. A device as claimed in claim 7, in which the strip of resiliently deformable material is located between the quantity of solder and the free end of the respective arm.

10. A device as claimed in claim 1, in which the line of weakness is such that when the sheet is folded into a U-shape, the arms extend substantially parallel from the line of weakness.

11. A device as claimed in claim 10, in which the line of weakness is provided by a substantially U-shaped groove in the support sheet.

12. A device as claimed in claim 11, in which the support sheet comprises two sheets of stiff material, each having a straight edge which is held adjacent, and substantially parallel, to the straight edge of the other sheet by a sheet of relatively flexible material, the straight edges of the sheets of stiff material together with the sheet of flexible material defining the U-shaped groove.

13. A device as claimed in claim 1, in which the line of weakness is provided by a line of perforation.

14. A device as claimed in claim 1, in which the quantity of solder is in the form of a tape.

15. A device as claimed in claim 14, in which the tape extends substantially parallel to the line of weakness.

16. A device as claimed in claim 1, which includes flux associated with the quantity of solder.

17. A device for applying solder to opposite faces of an object, comprising:
    (a) a support sheet having a line of weakness along which the sheet can be folded to define two arms, each having a free end;

(b) a solder tape mounted on a face of each arm, between the line of weakness and the free end of the respective arm, and extending substantially parallel to the line of weakness in the support sheet;
(c) a strip of resiliently deformable material located between each of the solder tapes and the ends of the respective arm; and
(d) a quantity of adhesive on each of the said faces of the arms between the strips of resiliently deformable material and the end of the respective arm.

* * * * *